(12) United States Patent
Sims (10) Patent No.: US 7,162,830 B2
(45) Date of Patent: Jan. 16, 2007

(54) REMOVABLE ATTACHMENT FOR A LINE

(76) Inventor: John Timothy Sims, P.O. Box 251, Bawbridge, GA (US) 39818

( * ) Notice: Subject to any disclaimer, the term of this patent is extended or adjusted under 35 U.S.C. 154(b) by 84 days.

(21) Appl. No.: 11/039,306

(22) Filed: Jan. 19, 2005

(65) Prior Publication Data

US 2006/0156613 A1    Jul. 20, 2006

(51) Int. Cl.
*A01K 95/02* (2006.01)
*A01K 95/00* (2006.01)

(52) U.S. Cl. .................. 43/44.9; 43/44.87; 43/44.92

(58) Field of Classification Search ............... 43/44.87, 43/44.89, 44.9, 44.91, 44.92, 44.93, 44.95
See application file for complete search history.

(56) References Cited

U.S. PATENT DOCUMENTS

| | | | | | |
|---|---|---|---|---|---|
| 2,001,241 | A | * | 5/1935 | De Vries | 43/44.9 |
| 2,315,048 | A | * | 3/1943 | Croft | 43/44.9 |
| 2,556,932 | A | * | 6/1951 | Morrissey | 43/44.91 |
| 2,741,067 | A | | 4/1956 | Cox | |
| 2,772,509 | A | * | 12/1956 | Vadnais | 43/44.91 |
| 2,807,907 | A | * | 10/1957 | Brite | 43/44.91 |
| 2,872,752 | A | * | 2/1959 | Salzmann | 43/44.9 |
| 2,874,511 | A | * | 2/1959 | Hettrick | 43/44.87 |
| 3,056,229 | A | * | 10/1962 | Haney | 43/44.91 |
| 3,091,050 | A | * | 5/1963 | Metzler | 43/44.91 |
| 3,096,599 | A | * | 7/1963 | Baron | 43/44.9 |
| 3,104,488 | A | * | 9/1963 | Hicks | 43/44.91 |
| 3,224,132 | A | * | 12/1965 | Frantz | 43/44.9 |
| 3,273,278 | A | * | 9/1966 | Lynch | 43/44.9 |
| 3,404,482 | A | * | 10/1968 | Maske | 43/44.9 |
| 3,577,669 | A | * | 5/1971 | Johnson et al. | 43/44.91 |
| 3,733,734 | A | * | 5/1973 | Hysaw | 43/44.9 |
| 3,803,749 | A | * | 4/1974 | Boyum | 43/44.9 |
| 3,808,728 | A | * | 5/1974 | Ratte, Jr. | 43/44.91 |
| 3,867,783 | A | * | 2/1975 | Simpson | 43/44.91 |
| 3,955,305 | A | * | 5/1976 | Roberts | 43/44.91 |
| 4,361,978 | A | * | 12/1982 | Kane | 43/44.91 |
| 4,418,492 | A | * | 12/1983 | Rayburn | 43/44.9 |
| 4,458,439 | A | * | 7/1984 | Garrett, Sr. | 43/44.92 |
| 4,472,903 | A | * | 9/1984 | Hutson | 43/44.91 |
| 4,598,493 | A | * | 7/1986 | O'Brien et al. | 43/44.9 |
| 4,615,136 | A | * | 10/1986 | Bank | 43/44.91 |
| 4,628,630 | A | * | 12/1986 | Bohme | 43/44.93 |

(Continued)

FOREIGN PATENT DOCUMENTS

GB     2166631 A  *  5/1986

(Continued)

*Primary Examiner*—Darren W. Ark
(74) *Attorney, Agent, or Firm*—John Wiley Norton (57) ABSTRACT

A new line attachment which is easily removed and attached to a fishing line. The attachment body features a longitudinal bore and slot through which a bushing and fishing line can be inserted. The bushing also features a longitudinal bore and slot through which a fishing line can be fed. The longitudinal bore and slot in the bushing also enable the bushing to be compressed to fit securely into the body of the attachment body, thereby preventing the attachment body and bushing assembly from becoming unintentionally separated from the fishing line. The preferred embodiment of the invention further comprises a rib on the outside surface of the bushing that prevents rotational movement of the bushing vis-à-vis the attachment body.

10 Claims, 8 Drawing Sheets

U.S. PATENT DOCUMENTS

| | | | | |
|---|---|---|---|---|
| 4,691,468 A | * | 9/1987 | Fernbach | 43/44.9 |
| 4,696,125 A | * | 9/1987 | Rayburn | 43/44.9 |
| 5,157,860 A | | 10/1992 | Clark | |
| 5,203,107 A | * | 4/1993 | O'Brien et al. | 43/44.9 |
| 5,216,831 A | * | 6/1993 | Halterman, Jr. | 43/44.91 |
| 5,241,774 A | * | 9/1993 | Rayburn | 43/44.9 |
| 5,305,534 A | * | 4/1994 | Lazich | 43/44.91 |
| 5,457,909 A | * | 10/1995 | Graves | 43/44.91 |
| 5,784,828 A | | 7/1998 | Thompson | |
| 6,125,574 A | * | 10/2000 | Ganaja et al. | 43/44.9 |
| 6,327,808 B1 | * | 12/2001 | Zascavage | 43/44.9 |

FOREIGN PATENT DOCUMENTS

| | | | | |
|---|---|---|---|---|
| GB | 2187922 A | * | 9/1987 | |
| GB | 2199471 A | * | 7/1988 | |
| GB | 2200022 A | * | 7/1988 | |
| GB | 2324451 A | * | 10/1998 | |
| JP | 7-308144 A | * | 11/1995 | |
| JP | 9-129 A | * | 1/1997 | |
| JP | 10-295240 A | * | 11/1998 | |
| JP | 10-295242 A | * | 11/1998 | |
| JP | 11-276045 A | * | 10/1999 | |
| JP | 2000-125733 A | * | 5/2000 | |
| JP | 2000-166448 A | * | 6/2000 | |
| JP | 2004-290051 A | * | 10/2004 | |

\* cited by examiner

REMOVABLE ATTACHMENT FOR A LINE

BACKGROUND OF THE INVENTION

1. Field of the Invention

This invention relates to the field of line attachments. More specifically, the invention comprises an attachment mechanism for removably attaching objects to a line.

2. Description of the Related Art

Many devices are attached to fishing lines such as sinkers, floaters, and dissolvable fish attractants. It is common for a fisherman to change one or more of these devices during the course of a fishing expedition to increase the likelihood of getting a "bite." Although the present invention relates to any sort of device that is attached to a fishing line, the invention will be considered as used in its most basic form—on a sinker.

Fishing sinkers or weights are widely used by fishermen to submerge fishing lures to the desired depth. Sinkers are typically made of small pieces of lead, brass, or other heavy material and are attached to the line. Inventors of prior art sinkers have employed different methods of attaching sinkers to the line to accomplish different objectives. Sometimes it is desirable for the sinker to be attached to the line so that it can slide freely on the line, and other times it is desirable to have the weight stay at a specific spot on the line. In most cases, however, it is desirable for the weight to be easily removable from the line.

The earliest fishing sinkers were either clamped or tied securely to a fishing line. To change the weight on a fishing line, a fisherman would have to cut the line and add a new weight. Since then, several inventions have addressed the issue of removability. U.S. Pat. Nos. 2,741,067, 4,691,468, 5,157,860 are representative of the prior art. These inventions, although removable, have presented other limitations by either requiring the use of tools or otherwise being cumbersome to deal with under typical fishing conditions.

It is therefore desirable to have a variety of fishing weight and other line attachments that can easily be added or taken off a line.

BRIEF SUMMARY OF THE INVENTION

The present invention comprises a new attachment mechanism for sinkers, floaters, fish attractants, and the like which is easily removed and attached to a line. The present invention is best exemplified as used in the form of a sinker which is attached to a fishing line. The sinker features a longitudinal bore and slot through which a bushing and fishing line can be inserted. The bushing also features a longitudinal bore and slot through which a fishing line can be fed and snap fingers which lock the bushing into the sinker. The preferred embodiment of the invention further comprises a rib on the outside surface of the bushing that prevents bushing from rotating with respect to the sinker.

REFERENCE NUMERALS IN THE DRAWINGS

| 10 | sinker | 12 | longitudinal bore |
|----|--------|----|----|
| 14 | longitudinal slot | 16 | bushing |
| 18 | longitudinal bore | 20 | longitudinal slot |
| 22 | rib | 24 | flange |
| 26 | fishing line | 28 | groove |
| 30 | snap finger | 32 | overhang |
| 34 | first end | 36 | second end |
| 38 | sinker assembly | 40 | swivel |
| 42 | bait | | |

DETAILED DESCRIPTION OF THE INVENTION

Figure 1:
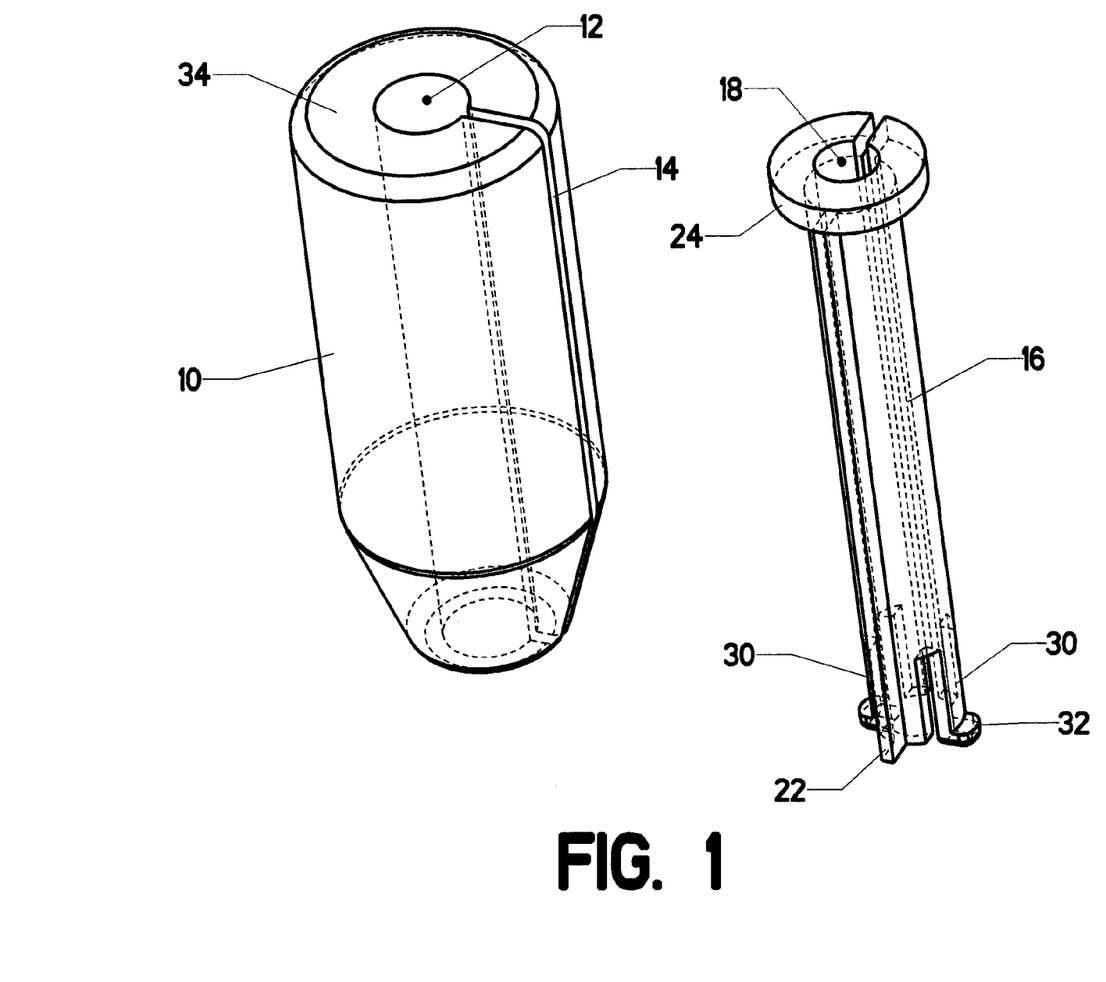
FIG. 1 is a perspective view, showing the pieces of the sinker and bushing assembly.

The component parts of the sinker and bushing assembly are shown in FIG. 1. Sinker 10 has longitudinal bore 12 which runs down the longitudinal central axis. Sinker 10 also has longitudinal slot 14 which is radial cutout wide enough for a fishing line to pass through and runs the length of sinker 10. Bushing 16 features a similar longitudinal bore 18 and longitudinal slot 20. Longitudinal slot 20 is also wide enough for a fishing line to pass through. Bushing 16 also features rib 22 which is narrow enough to fit into longitudinal slot 14. Flange 24 is also included on the top of bushing 16 to facilitate connection and separation of the two pieces. When the components of the sinker and bushing assembly are attached, flange 24 mates with first end 34 of sinker 10. Bushing 22 further includes two snap fingers 30 with overhangs 32 which secure the bushing to the sinker as will be later illustrated.

Figure 1B:
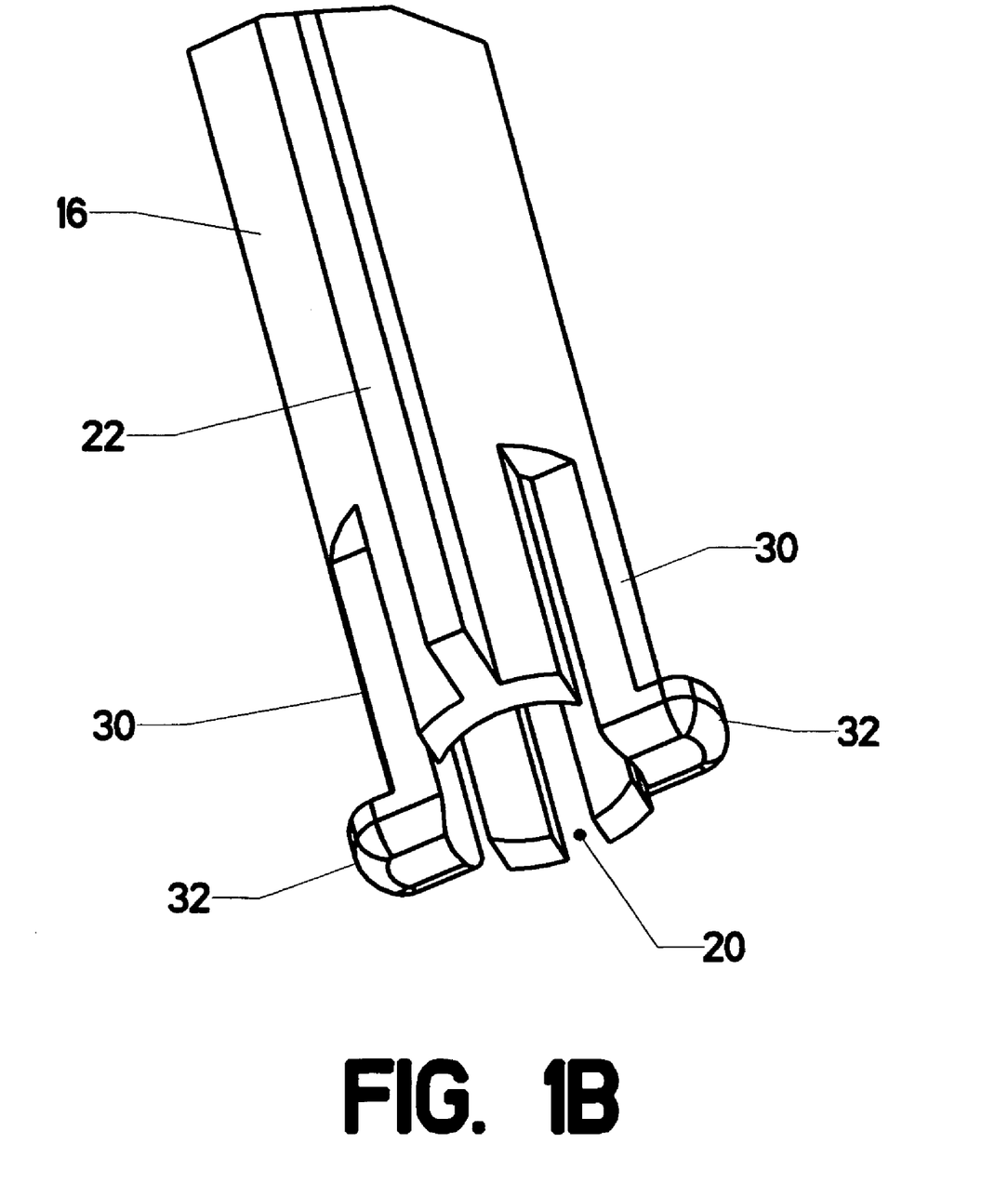
FIG. 1B is a perspective view, showing the bushing.

The bushing is shown from a different perspective in FIG. 1B. In the preferred embodiment rib 22 is placed on the side of bushing 16 opposite to longitudinal slot 20 and snap fingers 30 are placed therebetween. The reader will appreciate that each snap finger 30 is formed by a pair of longitudinal cutouts in bushing 16. This feature enables snap fingers 30 to be pressed together by the user without causing permanent deformation of the bushing.

Figure 2:
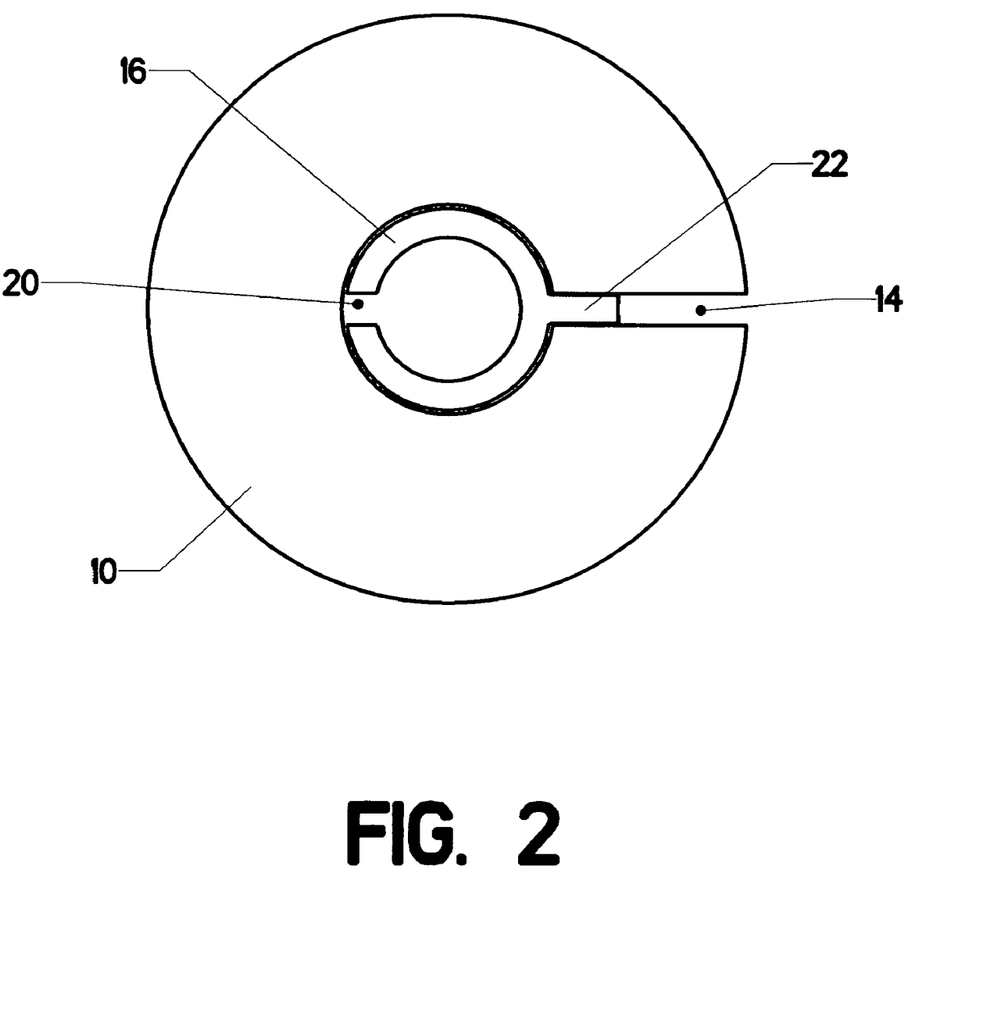
FIG. 2 is a section view, showing the sinker and bushing assembled.

A cross-sectional view of the assembly of the two component parts is shown in FIG. 2. Bushing 16 fits securely into longitudinal bore 12 of sinker 10. Bushing 16 can be composed of an elastic material, thereby increasing the frictional engagement of bushing 16 with walls of longitudinal bore 12. This feature also enables bushing 16 to be expanded to take different line sizes. Rib 22 of bushing 16 fits securely into longitudinal slot 14 of sinker 10 when the two components are insertably connected.

Figure 3:
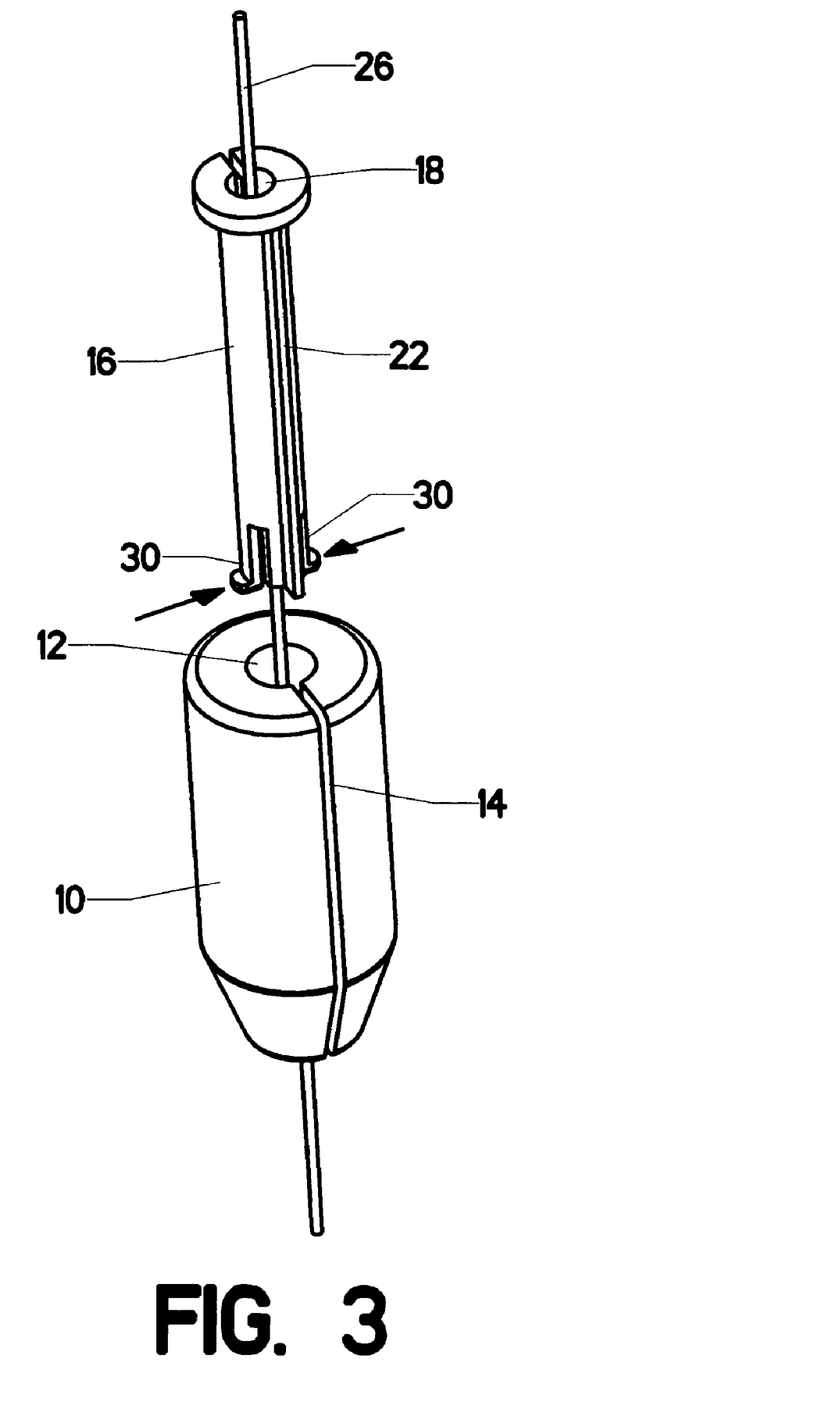
FIG. 3 is a perspective view, illustrating how the assembly is attached to a fishing line.
Figure 4:
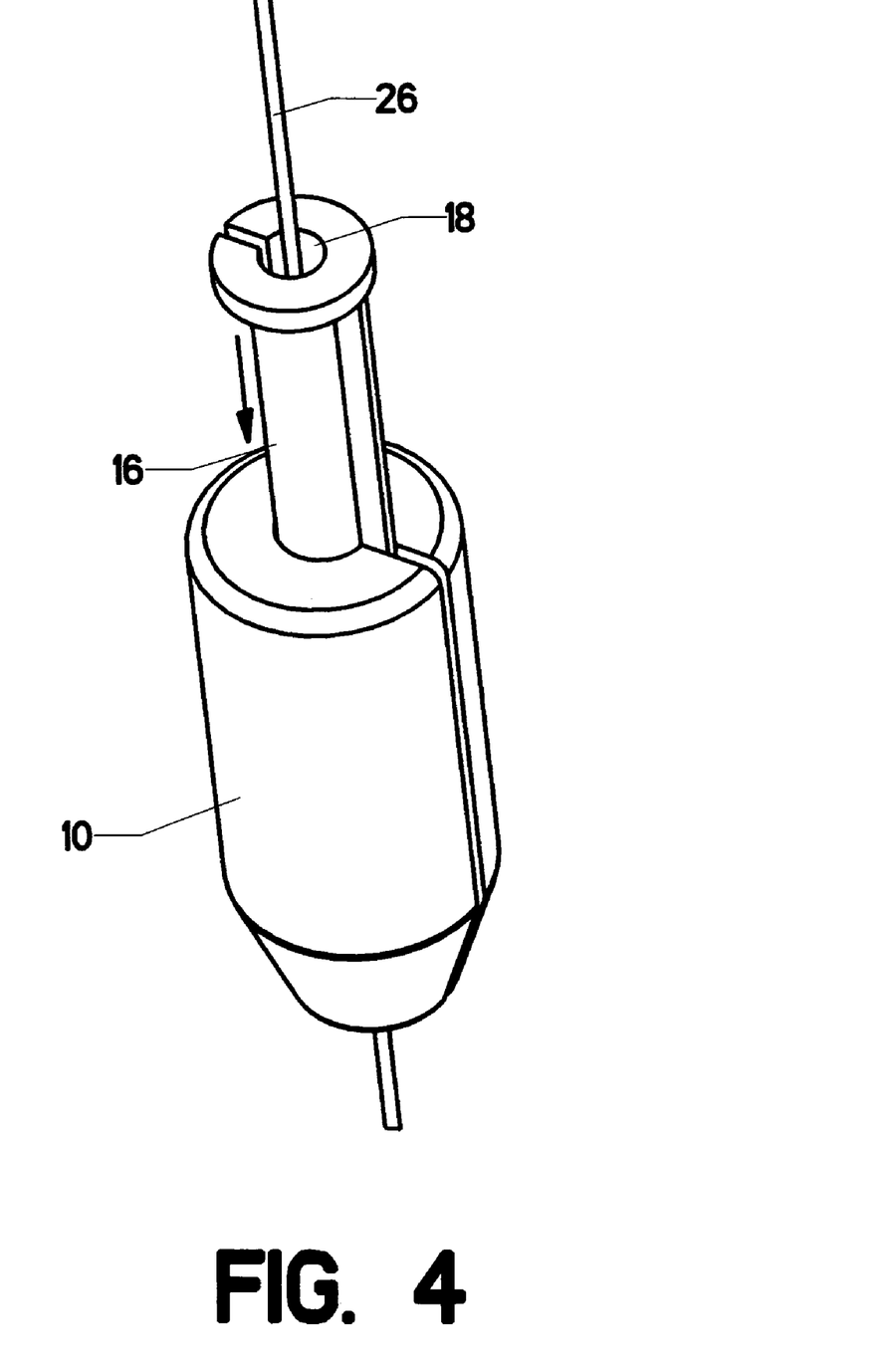
FIG. 4 is a perspective view, illustrating how the assembly is attached to a fishing line.

The sinker and bushing assembly is placed on the fishing line as shown in FIG. 3. Fishing line 26 is passed through longitudinal slot 20 of bushing 16 so that fishing line 26 is contained in the region of longitudinal bore 18. Fishing line 26 is also passed through longitudinal slot 14 of sinker 10 so that fishing line 26 is contained in longitudinal bore 12. Sinker 10 is turned so that longitudinal slot 14 faces onehundred-eighty degrees opposite the direction of longitudinal slot 20 of bushing 16. Snap fingers 30 are pressed together as illustrated in FIG. 3., and the two components are then insertably engaged as shown in FIG. 4. Bushing 16 is inserted down into sinker 10 while fishing line 26 is maintained in longitudinal bore 18. The reader will appreciate that the placement of rib 22 into longitudinal slot 14 both prevents the bushing 16 from rotating with respect to sinker 10, but also blocks the exit point for the line, so that the line attachment does not become unintentionally detached from the line.

Figure 5:
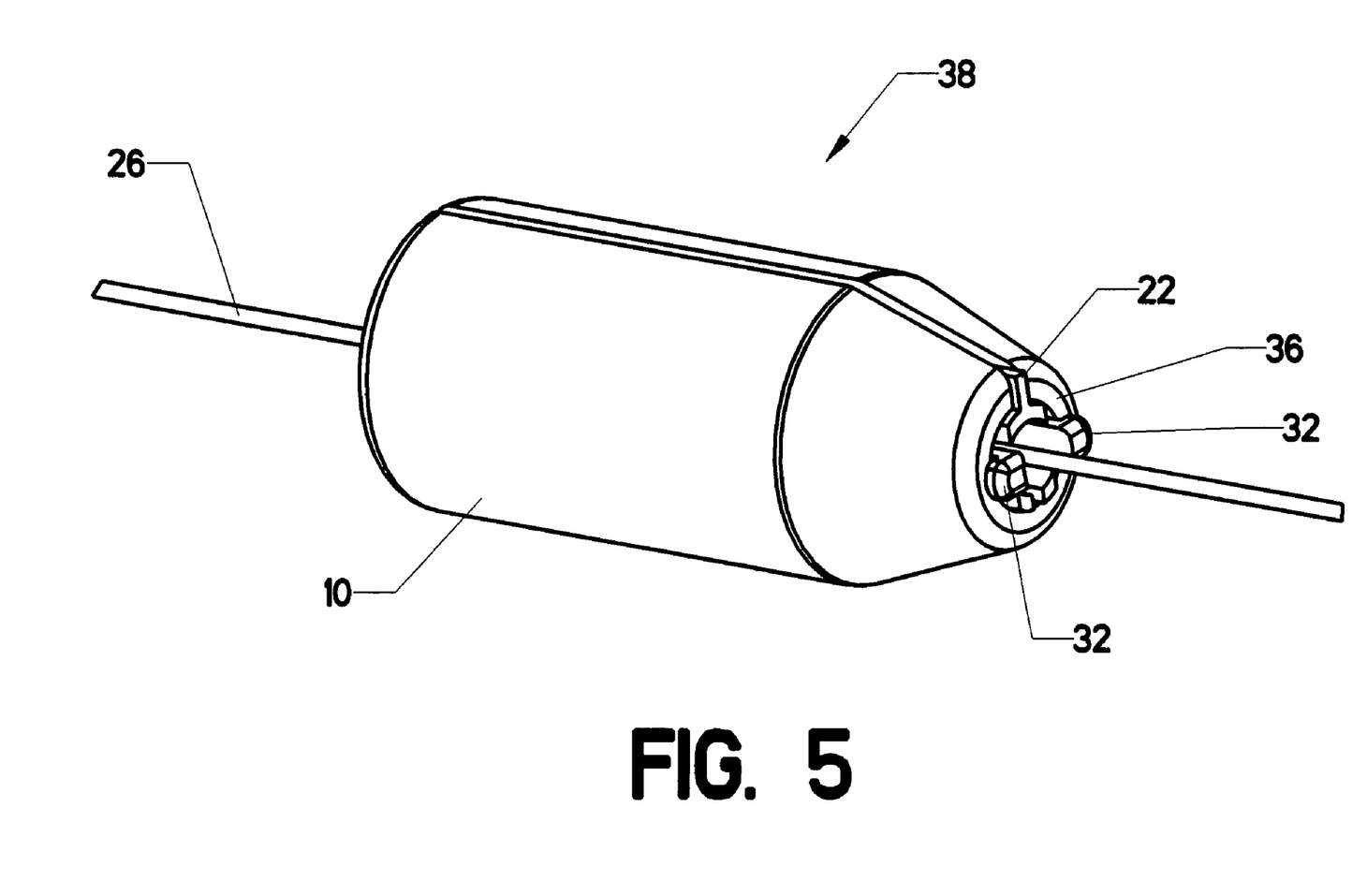
FIG. 5 is a perspective view, showing the present invention attached to a line.
Figure 6:
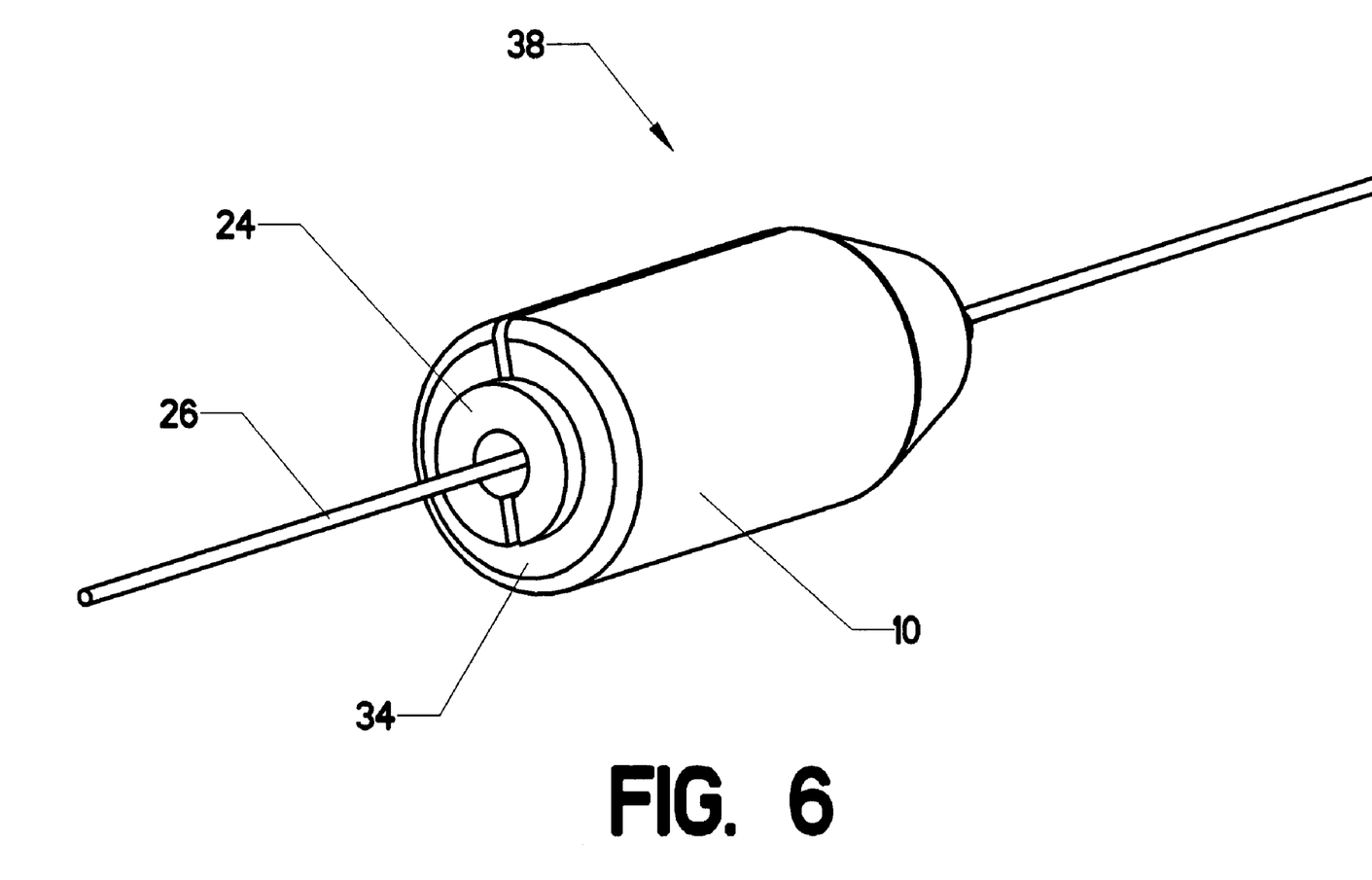
FIG. 6 is a perspective view, showing the present invention attached to a line.

FIGS. 5 and 6 show the sinker assembly attached to the line. As shown in FIG. 5, overhangs 32 which protrude from the snap fingers of bushing 16 mate with second end 36 of sinker 10 when sinker assembly 38 is attached to the line. As illustrated in FIG. 6, flange 24 mates with first end 34 of sinker 10 on the other side of sinker assembly 38. The reader will appreciate that the combination of flange 24 and overhangs 32 prevent sinker assembly 38 from becoming unintentionally disassembled on the line. The reader will also note that sinker assembly 38 can be removed from line 26 by pressing overhangs 32 together and pushing them back into longitudinal bore 12 of sinker 10. The user can then grab flange 24 of bushing 16 and pull bushing 16 out of sinker 10.

Figure 7:
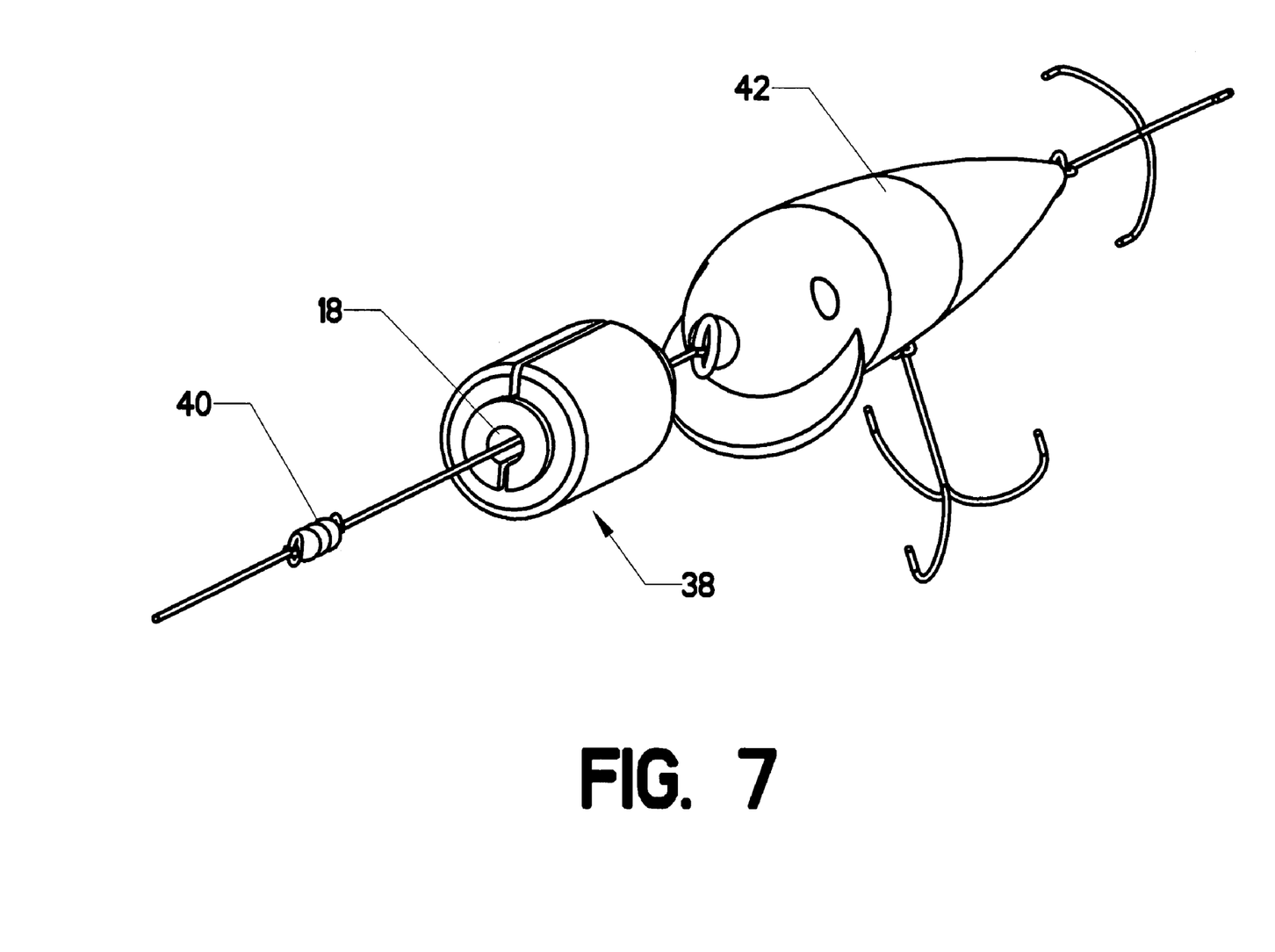
FIG. 7 is a perspective view, showing the present invention attached to a line.

Looking at FIG. 7, the enlargement of longitudinal bore 18 allows sinker assembly 38 to pass easily over swivel 40 and come to rest near bait 42. The longitudinal bore can likewise pass over other familiar line hardware, such as "sinkers" (weights), clips, and similar fasteners. All these items will be generically referred to as "line hardware."

The ability of the longitudinal bore to pass over line hardware is important for the following reason: When a lure is towed in a trolling fashion, it may be 50 yards or more behind the boat. In order to replace a conventional attractant, the lure must be reeled in, serviced, and allowed to trail back out to its original position (a time consuming process). Using the present invention—with an appropriately sized longitudinal bore 18—the user simply places sinker assembly 38 on fishing line 26 near the point where it attaches to the fishing rod. Gravity (sometimes with help from the user) cause sinker assembly 38 to slide down the line and into the water. Once sinker assembly 38 is in the water, hydrodynamic forces slide it aft along the fishing line until it comes to rest against the front of the bait. Thus, the user can add a sinker to the line without interrupting the trolling.

The preceding description contains significant detail regarding the novel aspects of the present invention. It is should not be construed, however, as limiting the scope of the invention but rather as providing illustrations of the preferred embodiments of the invention. For example, many shapes could be used for the sinker 10 without affecting the function of the invention. Also, the same attachment mechanism can be used in any situation where it is desirably to have an object removably attached to a line and is not limited to the attachment of objects to fishing lines. Thus, the scope of the invention should be fixed by the following claims, rather than by the examples given.

Having described my invention, I claim:

1. A fishing line attachment that can be removably attached to a fishing line comprising:
   a. an attachment body, having an elongated body, a first end, a second end, an outer perimeter, a longitudinal central axis, a longitudinal bore through said longitudinal central axis, and a radial slot running from said longitudinal central axis to said outer perimeter, wherein said radial slot is wide enough to run a fishing line therethrough;
   b. a compressible bushing having a cylindrical body, a longitudinal central axis, a longitudinal bore through said longitudinal central axis, at least one snap finger, a radial slot running from said longitudinal central axis to said outer perimeter wherein said radial slot is wide enough to run a fishing line therethrough;
   c. wherein said at least one snap finger includes an overhang which snaps over said second end of said attachment body when said compressible bushing is placed within said longitudinal bore;
   d. wherein said compressible bushing further comprises a longitudinal rib sized to fit within said radial slot of said attachment body, with said longitudinal rib being sufficiently stiff to prevent rotational movement of said compressible bushing with respect to said attachment body when said compressible bushing is inserted into said longitudinal bore of said attachment body; and
   e. wherein said at least one snap finger is defined on lateral sides thereof by at least one cutout in said compressible bushing which is laterally offset from said radial slot of said compressible bushing.

2. The fishing line attachment of claim 1, wherein said compressible bushing further comprises a flange, wherein said flange mates with said first end of said attachment body.

3. The fishing line attachment of claim 1, wherein said compressible bushing comprises two snap fingers.

4. The fishing line attachment of claim 3, wherein said compressible bushing further comprises a flange, wherein said flange mates with said first end of said attachment body.

5. The fishing line attachment of claim 1, wherein longitudinal bore of said compressible bushing is large enough for line hardware to slide completely therethrough.

6. The fishing line attachment of claim 1, wherein said longitudinal bore of said compressible bushing is too small to pass over line hardware.

7. A line attachment that can be removably attached to a line comprising:
   a. an attachment body, having a longitudinal slot, a longitudinal bore, a first end, and a second end;
   b. a compressible bushing, having a cylindrical body, a longitudinal slot, a longitudinal bore, a longitudinal rib, a first end, and a second end;
   c. wherein said compressible bushing is sized to fit into said longitudinal bore of said attachment body when said compressible bushing is slightly compressed;
   d. wherein said longitudinal rib of said compressible bushing is sized to fit into said longitudinal slot of said attachment body and wherein said longitudinal rib is sufficiently stiff to prevent rotational movement of said compressible bushing with respect to said attachment body;
   e. a flange proximate said first end of said compressible bushing, with said flange being large enough to prevent its passage through said longitudinal bore of said attachment body;
   f. at least one snap finger extending from said cylindrical body;
   g. wherein said at least one snap finger includes an overhang which snaps over said second end of said attachment body when said compressible bushing is pushed through said longitudinal bore of said attachment body; and
   h. wherein said at least one snap finger is defined on lateral sides thereof by at least one cutout in said compressible bushing which is laterally offset from said longitudinal slot of said compressible bushing.

8. The line attachment of claim 7, wherein said flange mates with said first end of said attachment body.

9. The line attachment of claim 7, wherein said cylindrical body includes at least two snap fingers extending therefrom.

10. The line attachment of claim 9, wherein said flange, mates with said first end of said attachment body.

* * * * *